United States Patent [19]

Ogawa et al.

[11] Patent Number: 4,670,802
[45] Date of Patent: Jun. 2, 1987

[54] SYSTEM FOR CONTROLLING LOADING AND EJECTION OF RECORDING MEDIUM ON A DISC UNIT

[75] Inventors: Tetsu Ogawa, Hanazono; Masahiro Kato, Chichibu, both of Japan

[73] Assignee: Canon Denki Kabushiki Kaisha, Chichibu, Japan

[21] Appl. No.: 542,162

[22] Filed: Oct. 14, 1983

[30] Foreign Application Priority Data

Oct. 18, 1982 [JP] Japan .................. 57-181360
Nov. 25, 1982 [JP] Japan .................. 57-205516
Nov. 25, 1982 [JP] Japan .................. 57-205517

[51] Int. Cl.⁴ .................................. G11B 5/012
[52] U.S. Cl. .................................. 360/97; 360/86; 369/77.2
[58] Field of Search .................. 360/97, 99, 105, 106, 360/130.34, 96.1, 133; 369/270, 271, 77.2

[56] References Cited

U.S. PATENT DOCUMENTS

| | | | |
|---|---|---|---|
| 4,040,107 | 8/1977 | Bryer | 369/77.2 |
| 4,193,102 | 3/1980 | Beuch et al. | 360/99 |
| 4,308,562 | 12/1981 | Negishi | 360/96.5 X |
| 4,361,859 | 11/1982 | Schatteman | 360/96.5 |
| 4,415,940 | 11/1983 | Becker | 360/105 X |
| 4,434,480 | 2/1984 | Fukumitsu | 369/77.2 |
| 4,466,033 | 8/1984 | Jordan et al. | 360/99 |
| 4,489,407 | 12/1984 | Kiguchi | 369/77.2 |
| 4,507,769 | 3/1985 | Fukumitsu et al. | 369/77.2 |
| 4,541,025 | 9/1985 | Sidhu et al. | 360/97 |
| 4,592,039 | 5/1986 | Toyoguchi et al. | 369/77.2 |

FOREIGN PATENT DOCUMENTS 2812621 9/1979 Fed. Rep. of Germany ...... 360/106

OTHER PUBLICATIONS

IBM Technical Disclosure Bulletin, Magnetic Head Unload Mechanism, W. P. Quinlan.

Primary Examiner—John H. Wolff
Assistant Examiner—Andrew S. Sniezek
Attorney, Agent, or Firm—Spencer & Frank

[57] ABSTRACT

A disc unit for recording or reproducing information on or from a recording/reproducing disc loaded therein, in which the disc, which is inserted into the disc unit through an insertion opening thereof is transferred to its operative position and the loaded disc is transferred from its operative position toward the insertion opening, through which the disc is discharged. The loaded disc is clamped at its operative position by the clamping mechanism. The single driving motor is selectively coupled to either one of the disc transfer mechanism or the clamping mechanism. The loaded disc can be discharged manually from the unit by controlling the rotating axis of the single driving motor from the outside of the unit. The insertion opening is shielded automatically when the loading is completed by the shielding plate. The plate may display a sign "LOADED". The recording/reproducing disc may be a magnetic disc or an optical disc.

41 Claims, 14 Drawing Figures

FIG_3

FIG_10
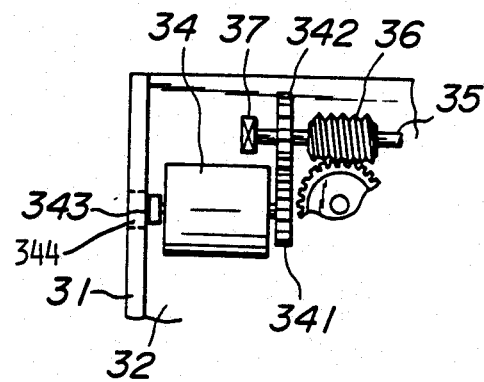
FIG_11
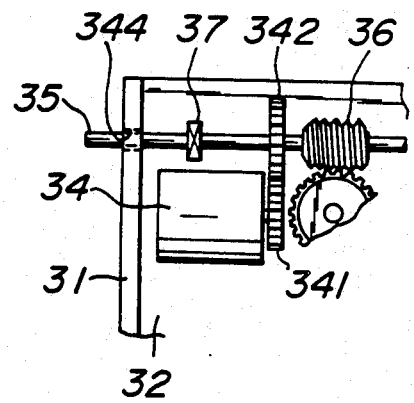

SYSTEM FOR CONTROLLING LOADING AND EJECTION OF RECORDING MEDIUM ON A DISC UNIT

BACKGROUND OF THE INVENTION

1. FIELD OF THE INVENTION

The present invention relates to a disc unit and more particularly to a disc unit suitable for a magnetic disc unit or an optical disc unit such as a laser disc or compact video disc unit in which a recording/reproducing head slidably contacts disc as a recording medium so that information is recorded on or reproduced from the disc.

2. DESCRIPTION OF THE PRIOR ART

There have been proposed a disc unit such as a magnetic disc unit of the type having an automatic loading mechanism so that a magnetic disc inserted through an insertion slot into the magnetic unit is automatically transferred to its operative position where information is recorded on or reproduced from the magnetic disc by a magnetic head and then is securely clamped in position. After the recording or reproducing, the magnetic disc is automatically released from its clamping condition and discharged through the insertion slot from the magnetic unit.

The magnetic disc unit of the type described is provided with two separate drive means. One drive means is used to transport a magnetic disc from the insertion slot to the operative position, while the other drive means is used to clamp the magnetic disc to a driving mechanism for rotating the magnetic disc.

A conventional magnetic disc unit with two independent drive means as described above will be described in detail with reference to FIGS. 1 and 2.

In FIG. 1, showing the block diagram of the magnetic disc unit, to the inputs of a control unit 1, connected are magnetic disc insertion detection means or first detection means 2, second detection means 3 for detecting whether or not a magnetic disc has been transferred to its operative position, third detection means 4 for detecting whether or not a clamping mechanism has been returned to its initial position, fourth detection means 5 for detecting whether or not the clamp of the magnetic disc is completed and a magnetic disc discharge switch 6 for instructing the discharge of the magnetic disc.

One of the outputs of the control unit 1 is connected to a first motor drive circuit 7 which in turn is connected to a first motor 8 which is coupled to a mechanism 9 for transporting the magnetic disc. Therefore, in response to the output signal from the control unit 1, the first motor drive circuit 7 is activated so as to drive the first motor 8, whereby the magnetic disc is transported by the mechanism 9.

The other one of the outputs of the control unit 1 is connected to a second motor drive circuit 10 which in turn is connected to a second motor 11 which is coupled to a clamping mechanism 12. Therefore, in response to the output signal from the control unit 1, the second motor drive circuit 10 is activated so as to drive the second motor 11, whereby the clamping mechanism 12 is actuated.

In a timing chart shown in FIG. 2 to explain the operations of the conventional magnetic disc unit of the type described above with reference to FIG. 1, reference numeral 2s designates an output signal derived from the first detection means; 3s, an output signal derived from the second detection means; 4s, an output signal derived from the third detection means; 5s, an output signal derived from the fourth detection means; 6s, an output signal derived from the magnetic disc discharge switch 6; 8s, a signal for driving the first motor 8; and 11s, a signal for driving the second motor 11.

When a magnetic disc is inserted into the magnetic disc unit, this insertion is detected by the first detection means 2, so that the output signal 2s is obtained and simultaneously the first motor 8 is driven to rotate in the clockwise direction or in one direction.

As a consequence, the inserted magnetic disc is transported through the magnetic disc unit to its operative position. When the transfer of the magnetic disc is completed, the second detection means 3 generates the output signal 3s. In response to this signal 3s, the first motor 8 stops its rotation. At the same time, the second motor 11 is driven to rotate, so that the magnetic disc is clamped. When the magnetic disc is clamped, the fourth detection means 5 generates the signal 5s. In response to this signal 5s, the second motor 11 stops its rotation. Thus, the magnetic disc is securely clamped at its operative position.

Thereafter, information is recorded on or reproduced from the magnetic disc in a manner well known in the art. When the recording or reproducing operation is completed, the magnetic disc discharge switch 6 is depressed so that the signal 6s is generated. In response to this signal 6s, the second motor 11 is driven to rotate in the counterclockwise direction or in the other direction, so that the magnetic disc is released from its clamping condition and consequently the clamping mechanism has returned to its initial position.

Then, the third detection means 4 generates the signal 4s. In response to this signal 4s, the second motor 11 stops its rotation. At the same time, the first motor 8 is driven to rotate in the counterclockwise direction or the other direction, so that the magnetic disc is discharged from the magnetic disc unit.

When the magnetic disc is discharged, the output signal 2s from the first detection means 2 is turned off or becomes a low level, so that the first motor 8 stops its rotation. That is, the operation for discharging the magnetic disc from the magnetic disc unit is completed.

In such a conventional magnetic disc unit as described above, the two motors 8 and 11 are used, so that the control circuit as well as control timings are complicated. In addition, a relatively large number of component parts are required, so that the magnetic disc unit is large in size and heavy in weight.

Furthermore, in the conventional magnetic disc unit of the type described above, the magnetic disc is not easily discharged from the magnetic disc unit once it is inserted, even when the malfunction of the automatic loading or discharging mechanism occurs. As a result, in order to take the magnetic disc out of the magnetic disc unit, there is no way but to remove a cover or some portion of the unit.

Moreover, the conventional magnetic disc unit of the type described above is not provided with means for notifying an operator whether or not a magnetic disc has been already loaded into the magnetic disc unit. As a result, erroneous operations resulting from the loading of the magnetic disc is not prevented.

SUMMARY OF THE INVENTION

It is, therefore, an object of the present invention to provide a disc unit in which the loading, the discharging and the clamping of a disc is performed by using only a single prime mover or motor.

It is another object of the present invention to provide a disc unit in which a disc can be discharged manually from the disc unit when an automatic loading and discharging mechanism of the disc does not work satisfactorily.

It is still a further object of the present invention to provide a disc unit having an automatic loading mechanism in which an erroneous contact of an alien substance like a finger of an operator with the disc is prevented during the recording or reproducing operation so as not to disturb the recording or reproducing.

It is still a further object of the present invention to provide a disc unit which can inform an operator that a disc is loaded.

In order to achieve the above objects, in a first aspect of the present invention, a disc unit for recording or reproducing information on or from a disc loaded therein comprises disc transfer means for transferring the disc which is inserted into the disc unit through an insertion opening thereof to its operative position and for transferring the loaded disc from its operative position toward the insertion opening, through which the disc is discharged, clamping means for clamping the loaded disc at its operative position, single drive means for selectively driving either one of the disc transfer means and the clamping means, and clutch means for selectively coupling the single drive means to either of the disc transfer means and the clamping means.

It is preferable that a disc unit according to the present invention further comprises roller means so disposed as to be engaged with one major surface of the disc inserted through the insertion opening, for transferring the inserted disc toward the operative position when the rotation of the single drive means in one direction is transmitted to the roller means and for transferring the loaded disc toward the insertion opening, through which the disc is discharged out of the disc discharge unit when the rotation of the single drive means in the other direction is transmitted to the roller means and coupling means for transmitting the rotation of the single drive means to the roller means. The coupling means may have cam means drivingly coupled to the single drive means. The cam means actuates the coupling means in a manner that the transmission of the rotation of the single drive means to the roller means is interrupted when the transfer of the disc by the rotation of the single drive means in the one direction is completed and then the cam means actuates the clamping means in a manner that the clamping means clamps the disc when the interruption is completed. In addition, the cam means actuates the clamping means in a manner that the disc is released when the rotation of the single drive means starts rotating in the other direction and then the cam means actuates the coupling means in a manner that the rotation of the single drive means is transmitted to the roller means when the release is completed.

The disc unit may further comprise manual drive means for manually driving the disc transfer means in a manner that the load disc is transferred toward the insertion opening so that the loaded disc is discharged from the insertion opening. The manual drive means may manually drive the clamping means to release the loaded disc.

Here, it is preferable that the manual drive means comprises a rotating member having one end which is so disposed that the rotating member can manually be rotated from the outside of the disc unit, and the disc transfer means is driven so as to transfer the disc toward the insertion opening, so that the the disc is discharged from the insertion opening.

The one end of the rotating member may be extended outwardly from the surface of the disc unit.

The single drive means may comprise an electric motor, and the manual drive means may comprise a rotating member which is coaxially coupled to the output shaft of the electric motor, so that the rotating member can be rotated from the outside of the surface of the disc unit.

The disc unit may further comprise shielding means for shielding the insertion opening when the disc is loaded into the disc unit.

Here, the shielding means may have a member such as a plate for closing the insertion opening and the member has a front surface for displaying information such as a sign of "LOADED", which means that a disc is loaded into the unit, at such a position of the surface that the display is viewed when the member closes the insertion opening.

In a second aspect of the present invention, a disc unit, in which information is recorded on or reproduced from a disc loaded therein, comprises disc transfer means for transferring the disc which is inserted into the disc unit through an insertion opening thereof to its operative position and for transferring the loaded disc from its operative position toward the insertion opening, through which the disc is discharged, single driving means for driving the disc transfer means, and manual drive means for manually driving the disc transfer means in a manner that the load disc is transferred toward the insertion opening so that the loaded disc is discharged from the insertion opening.

Here, it is preferable that the manual drive means comprises a rotating member having one end which is so disposed that the rotating member can manually be rotated from the outside of the disc unit, and the disc transfer means is driven so as to transfer the disc toward the insertion opening, so that the the disc is discharged from the insertion opening.

The one end of the rotating member may be extended outwardly from the surface of the disc unit.

The single drive means may comprise an electric motor, and the manual drive means may comprise a rotating member which is coaxially coupled to the output shaft of the electric motor, so that the rotating member can be rotated from the outside of the surface of the disc unit.

The disc unit may further comprise shielding means for shielding the insertion opening when the disc is loaded into the disc unit.

Here, the shielding means may have a member such as a plate for closing the insertion opening and the member has a front surface for displaying information such as a sign labeled "LOADED", which means that a disc is loaded into the unit, at such a position of the surface that the display is viewed when the member closes the insertion opening.

In a third aspect of the present invention, a disc unit comprises an insertion opening through which a disc is inserted into the disc unit, loading means for transferring the inserted disc to a predetermined position within the disc unit, means for recording or reproducing information on or from the loaded disc, and shielding means for shielding the insertion opening when the disc is brought to the predetermined position by the loading means.

Here, the shielding means may have a member such as a plate for closing the insertion opening and the member has a front surface for displaying information such as a sign labeled "LOADED", which means that a disc is loaded into the unit, at such a position of the surface that the display is viewed when the member closes the insertion opening.

A disc unit according to the present invention can advantageously be applied not only to a magnetic disc unit but also to an optical disc unit such as a laser disc or compact video disc unit.

The above objects, effects and features of the present invention will become more apparent from the following description of preferred embodiments thereof taken in conjunction with the accompoanying drawings, in which:

BRIEF DESCRIPTION OF THE DRAWINGS

FIGS. 10 and 11 are fragmentary top views showing two embodiments of a manual magnetic disc discharging mechanism in accordance with the present invention, respectively;

DETAILED DESCRIPTION OF THE PREFERRED EMBODIMENTS

While the present invention is not limited to a magnetic disc unit and is applicable to an optical disc unit, the following embodiments of the present invention is mainly directed to a magnetic disc unit.

First embodiment, FIGS. 3 through 9

Figure 1:
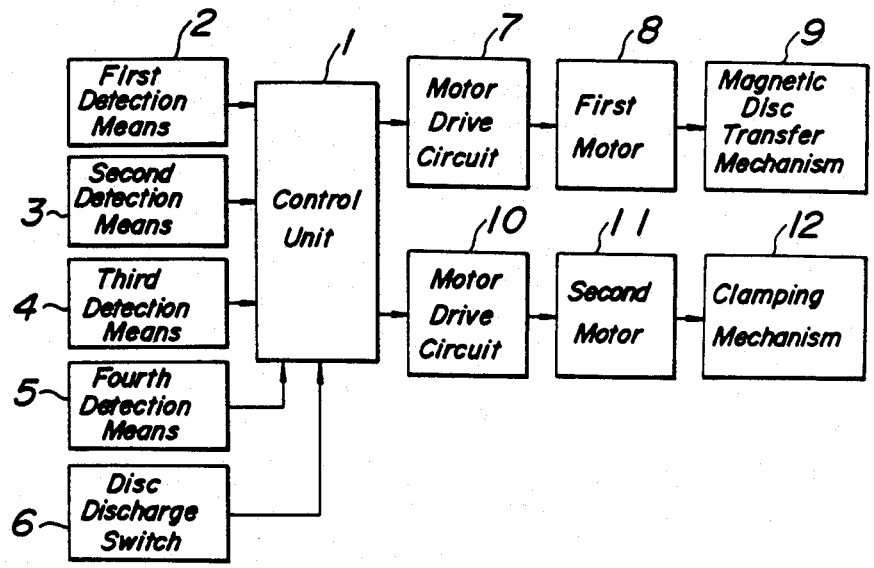
FIG. 1 is a block diagram showing the control circuit of a conventional magnetic disc unit.
Figure 2:
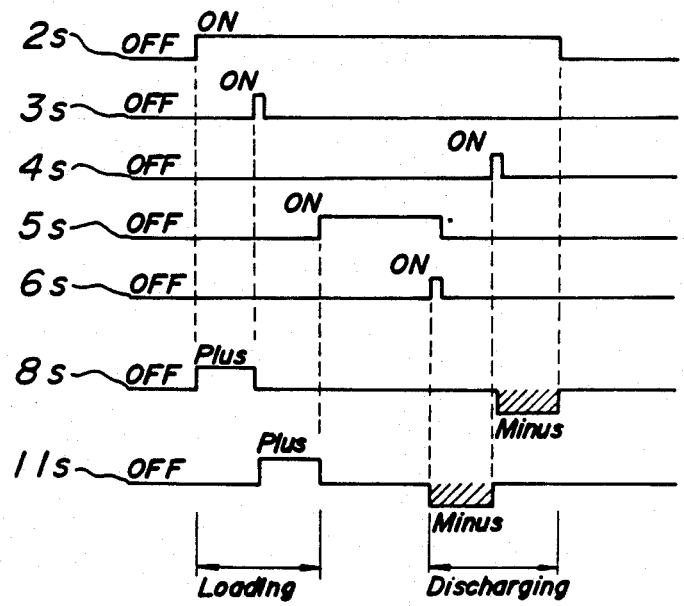
FIG. 2 is a timing chart illustrating the mode of operation of the conventional magnetic disc unit.
Figure 3:
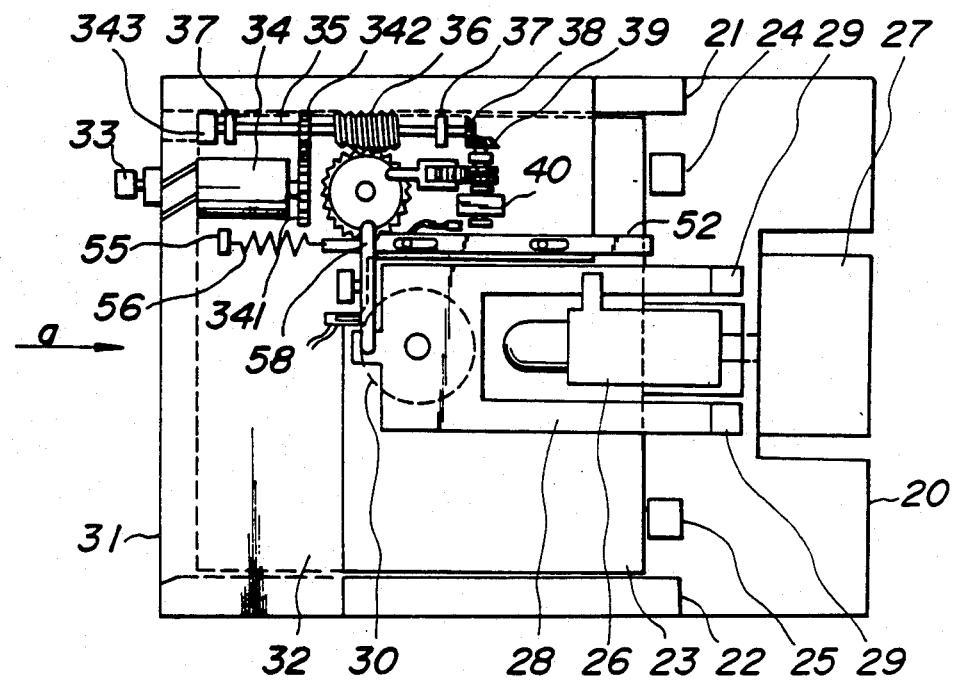
FIG. 3 is a top view showing a major portion of a first embodiment of a magnetic disc unit in accordance with the present invention.

FIGS. 3–9 show a first embodiment of a magnetic disc unit as a disc unit according to the present invention. Referring first to FIG. 3, reference numeral 20 denotes a frame. Parallel guides 21 and 22 having substantially a U shape are extended along the opposite sides, respectively, of the main frame 20 and a magnetic disc 23 encased in a flat case is guided along the guides 21 and 22. Stoppers 24 and 25 are extended from the frame 20 between the guides 21 and 22 so as to limit the inward movement of the magnetic disc or magnetic disc cassette 23. A head arm 26 is carried by a carriage (not shown) which is driven by a driving mechanism 27.

An arm 28 in the form of a substantially elongated U-shape for supporting a center cone 30 is disposed downwardly of the head arm 26, and base ends of the supporting arm 28 on one side thereof are securely fixed to the frame 20 through leaf springs 29, while the center cone 30 is disposed on the lower side of the other free end of the supporting arm 28. The supporting arm 28 is normally biased upwardly under the forces of the leaf springs 29.

Figure 7:
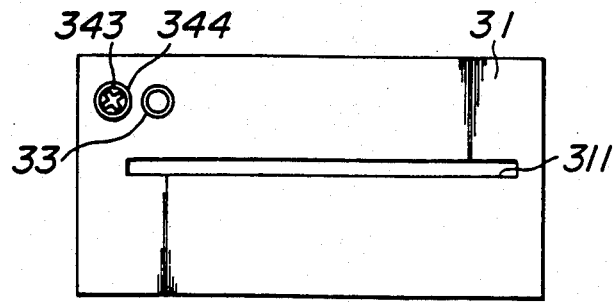
FIG. 7 is a front view showing a front panel of the magnetic disc unit.

A front panel 31 is attached to the frame 20 on a side opposite to the side to which the driving unit 27 is attached. The front panel 31 has a magnetic disc cassette insertion opening such as slot 311, as shown in FIG. 7. An upper frame 32 is disposed on the side of the front panel 31. A magnetic disc cassette discharge switch 33 is mounted on the front panel 31 adjacent to one end of the cassette insertion slot 311, as shown in FIG. 7.

A motor 34 is attached to the upper frame 32 adjacent to the discharge switch 33. The motor 34 is energized so that the magnetic disc cassette 23 is inserted into or discharged from the magnetic disc unit. A gear 341 coupled to the output shaft of the motor 34 is in mesh with a gear 342 carried by a rotary shaft 35 which is extended in parallel with the output shaft of the motor 34.

The rotary shaft 35 to which a worm 36 is also attached fixedly is rotatably supported by bearings 37 at its ends. A bevel gear 38 fixedly attached to the rotary shaft 35 at its outer end is in mesh with another bevel gear 39 carried by a shaft perpendicular to the rotary shaft 35 at one end thereof.

Figure 4:
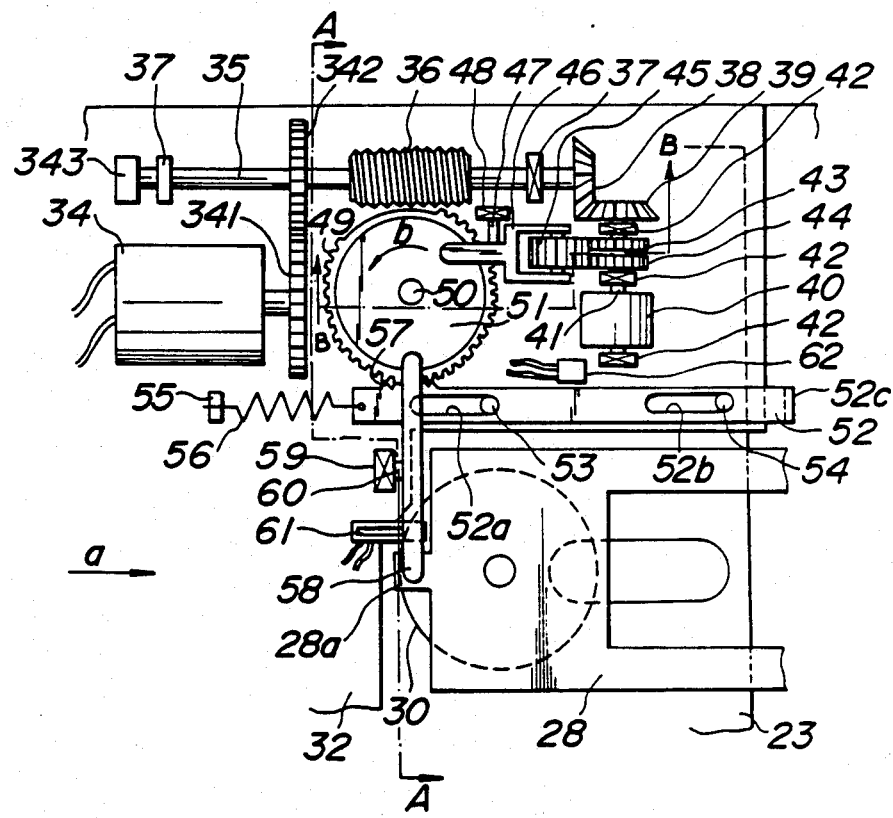
FIG. 4 is a fragmentary top view showing, on an enlarged scale, the major portion of the embodiment of FIG. 3.

A gear 43 is fixedly attached to the shaft at an end opposite to the end carrying the bevel gear 39 in coaxial relationship with the bevel gear 39, as shown in FIG. 4 and a gear 44 is fixedly attached to a shaft 41 at one end thereof in coaxial relationship with the gear 43.

A roller 40 is carried at the other end of the shaft 41 which is supported by bearings 42. The gears 43 and 44 are in mesh with a coupling gear 45 which is rotatably supported by one end of a gear frame or yoke 46 which is pivoted with a pivot pin 47 at its middle point. The pivot pin 47 in turn is supported rotatably by a bearing 48.

Figure 5B:
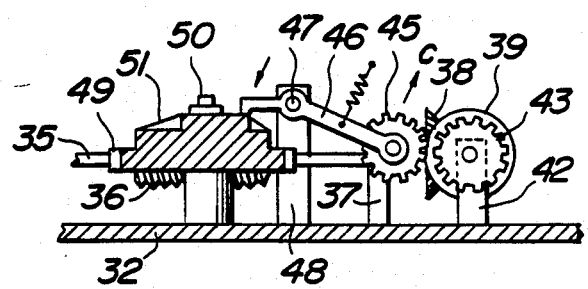
FIG. 5B shows a cross-sectional view taken along line B—B of FIG. 4.
Figure 5A:
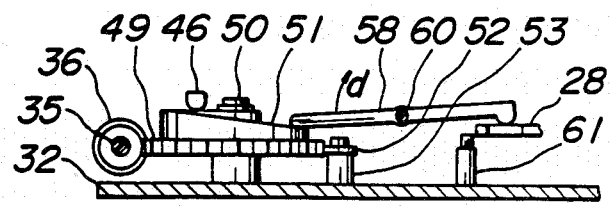
FIG. 5A is a cross-sectional view taken along the line A—A of FIG. 4
Figure 6:
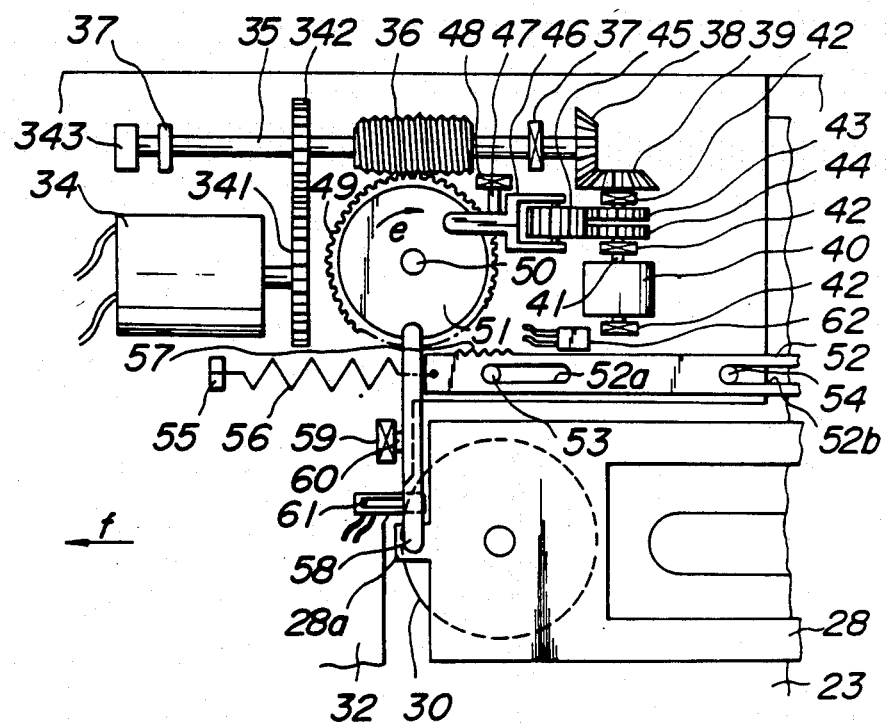
FIG. 6 is a fragmentary top view showing, on enlarged scale, the major portion of the embodiment of FIG. 3 when the magnetic disc is discharged from the magnetic disc unit.

A worm wheel 49 which is carried by a shaft 50 is in mesh with the worm 36. As best shown in FIGS. 4 and 6, some of the teeth of the worm wheel 49 are eliminated. A cam with an inclined upper surface 51 is fixedly attached to the upper surface of the worm wheel 49 in coaxial relationship with the shaft 50, as shown in FIGS. 5A and 5B. The other end of the gear frame or yoke 46 is brought into engagement with the inclined upper surface of the cam 51.

A switching lever 52 is disposed on the side of the worm wheel 49 opposite to the worm 36 and in parallel with the output shaft of the motor 34, as shown in FIG. 6. The switching lever 52 has two elongated slots 52a and 52b spaced apart from each other in the axial direction. Guide pins 53 and 54 which are protruded from the upper frame 32 are slidably inserted into the elongated slots 52a and 52b, respectively.

A spring 56 is loaded between the other end of the switching lever 52 on the side of the front panel 31 and a projection 55 extruded from the upper frame 32, so that the switching lever 52 is normally biased in the left direction as shown in FIG. 4; that is, toward the front panel 31. The side edge of the switching lever 52 on the side of the worm wheel 49 is partially formed with a rack 57. The switching lever 52 has a bending end 52c which is bent downward and remote from the spring 56 as indicated in FIG. 4.

One end of a lever 58 is made into engagement with the inclined surface of the cam 51, while the other end of the lever 58 is made into engagement with a projection 28a extended from the free end of the supporting arm 28, as shown in FIGS. 4-6. The lever 58 is fixedly attached at its middle point to a pivot pin 60 which in turn is pivotally supported by bearing 59.

A microswitch 61 for detecting whether the magnetic disc is clamped or not is disposed below the lever 58, as shown in FIG. 5. A photoswitch or photocoupler 62 for detecting whether the magnetic disc 23 is inserted or not is disposed in the vicinity of the roller 40.

As shown in FIG. 7, a cap 343 is detachably attached to the front end of the rotary shaft 35, as shown in FIGS. 4 or 6 and is fitted into an opening 344 formed through the front panel 31 as shown in FIG. 7. The top of the cap 343 is formed with a plus (+) or minus (−) groove, so that the cap 343 can be easily rotated by a screwdriver.

Figure 8:
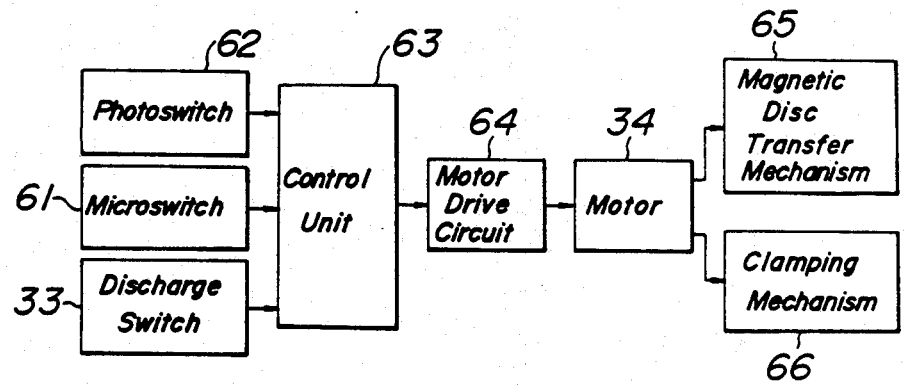
FIG. 8 is a block diagram showing a control circuit of a magnetic disc unit in accordance with the present invention.

FIG. 8 shows a block diagram of a control circuit of a magnetic disc unit in accordance with the present invention.

The control circuit has a control unit 63, the inputs of which are connected to the photoswitch 62, the microswitch 61 and the discharge switch 33. In response to the signal from the control unit 63, a motor drive circuit 64 is energized to drive the motor 34, so that either one of a magnetic disc displacement mechanism 65 and a clamping mechanism 66 is selectively activated.

Next, the mode of operations of the first embodiment with the above described construction will be described in detail with further reference to FIG. 9.

First, as shown in FIGS. 3 and 4, the magnetic disc is inserted through the insertion slot 311 of the front panel 31 in the direction indicated by an arrow a. Then the insertion of the magnetic disc is detected by the photoswitch 62 which in turn generates a magnetic disc insertion signal 62s (See FIG. 9). At the same time, the motor 34 is rotated in the clockwise direction and the rotation of the motor 34 is transmitted through the gears 341 and 342 and the shaft 35 to the worm 36. The rotation of the motor 34 is further transmitted from the shaft 35 through the bevel gears 38 and 39, the gear 43, the coupling gear 45 and the gear 44 to the roller 40. As a result, the roller 40 rotates. Therefore, the inserted magnetic disc 23 is transferred by the roller 40 in the direction indicated by the arrow a. After the leading edge of the magnetic disc 23 engages with the bent portion 52c of the switching lever 52, the switching lever 52 proceed forwardly in the direction indicated by the arrow a against the force of the bias spring 56. As a result, the rack 57 of the switching lever 52 engages with the teeth of the worm wheel 49, so that the worm wheel 49 is rotated in the direction indicated by an arrow b, as shown in FIG. 4.

As described above, since some of the teeth of the worm wheel 49 are eliminated, the switching lever 52 advances forwardly in the direction as indicated by the arrow a until the worm wheel 49 meshes with the worm 36.

When the worm wheel 49 meshes with the worm 36, the rotation of the worm 36 is transmitted to the gear frame or yoke 46, so that the worm wheel 49 is rotated in unison with the cam 51.

Then, one end of the lever 58 engages with the higher inclined surface portion of the cam 51, so that the lever 58 is caused to rotate about the pivot pin 60 in a clockwise direction d, as shown in FIG. 5A. As a result, the other end of the lever 58 pushes the supporting arm 28 downwardly, which is normally biased upwardly, so that the center cone 30 clamps the magnetic disc 23.

On the other hand, the contact position of the other end of the gear frame 46 is displaced toward a lower portion from a higher portion of the inclined surface of the cam 51, contrary to the lever 58, so that the coupling gear 45 is rotated, as the gear frame 46 is rotated, in the direction c (FIG. 5B) about the pivot pin 47 under the force of a spring 100. As a consequence, the coupling gear 45 is disengaged from the gears 43 and 44, so that the rotation of the motor 34 is not transmitted to the roller 40 and consequently the transfer of the magnetic disc 23 is stopped. Thereafter, the magnetic disc 23 is clamped at this position. Under these conditions, the rack 57 of the switching lever 52 is out of mesh with the worm wheel 47.

Figure 9:
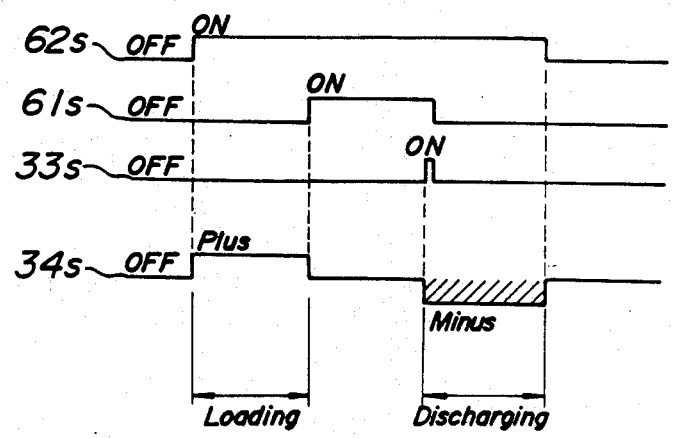
FIG. 9 is a timing chart illustrating the mode of operation of the first embodiment.

Referring particularly to FIG. 5A, when the lever 58 is caused to rotate in the clockwise direction as indicated by the arrow d, the microswitch 61 is closed to produce the signal 61s representative of the completion of clamping the magnetic disc 23, as illustrated in FIG. 9, so that the motor 34 stops its rotation. Thus, the magnetic disc 23 is loaded into the magnetic disc unit and securely clamped at its operative position.

Next, the discharge of the magnetic disc 23 from the magnetic disc unit after the recording or reproduction will be described. In this case, first the discharge switch 33 is pushed, so that the magnetic disc discharge signal 33s is generated, as illustrated in FIG. 9. As a result, the motor 34 is rotated in the counterclockwise direction.

Upon the rotation of the motor 34 in the counterclockwise direction, the worm wheel 49 which is in mesh with the worm 36 is caused to rotate in the clockwise direction as indicated by an arrow e in FIG. 6, so that the lever 58 and the gear frame 46 are caused to move in the opposite direction. That is, lever 58 is rotated in the counterclockwise direction and the gear frame 46 is moved upwardly.

As a result, the supporting arm 28 is caused to move upwardly under the forces of the leaf springs 29 as it is disengaged from the lever 58, so that the magnetic disc is released from its clamping. Meanwhile, the coupling gear 45 is moved downwardly and engages with the gears 43 and 44 so that the roller 40 is rotated in the opposite or counterclockwise direction. As a result, the magnetic disc 23 is displaced in the direction as indicated by an arrow f in FIG. 6. When the leading edge of the magnetic disc 23 passes the photoswitch 62, the magnetic disc insertion signal 62s is turned off, as illustrated in FIG. 9, so that the motor 34 is stopped. Thus, the discharging operation of the magnetic disc 23 is completed.

Under these conditions, the trailing edge of the magnetic disc 23 is extended outwardly by a predetermined distance from the insertion slot 311 of the front panel 31, so that an operator can easily pick up the discharged magnetic disc 23 to take it out of the magnetic disc unit.

According to the present invention, therefore, only one prime mover or motor is used to insert or load the magnetic disc into the magnetic disc unit, discharge the magnetic disc from the magnetic disc unit and clamp the magnetic disc in its operative position, i.e., the recording or reproduction position.

Now, it is assumed that some malfunction occurs in the automatic loading and clamping mechanism or the automatic discharge mechanism. Then, an operator inserts a screwdriver through the opening 344 of the front panel 31 shown in FIG. 7, so that the screwdriver is engaged with the cap 343. When the operator turns the screwdriver, the shaft 35 is rotated in such a direction as the magnetic disc 23 is discharged from the magnetic disc unit. That is, the magnetic disc 23 can be discharged from the magnetic disc unit manually by the screwdriver. In this case, when the shaft 35 is rotated manually, the cam 51 is also rotated, so that the center cone 30 is released from the magnetic disc 23.

Thus, according to the present invention, even in the case of a malfunction of the automatic loading and clamping mechanism or the automatic discharging mechanism, the magnetic disc can be discharged from the magnetic disc unit manually. As a consequence, contrary to a conventional magnetic disc unit, it is not necessary to remove a cover or the like in order to take out the magnetic disc. That is, no cumbersome operation is needed in order to take out the magnetic disc.

FIGS. 10 and 11 show two modifications of a mechanism for discharging a magnetic disc manually.

In the first modification shown in FIG. 10, the cap 343 is not attached to the rotary shaft 35, but is attached to the free end of the output shaft of the motor 34 on the side of the front panel 31. The opening 344 is formed through the front panel 31 in a manner such that the opening 344 is opposite to the cap 343. Therefore, when an operator engages a screwdriver with the cap 343 through the opening 344 to turn the cap 343, the output shaft of the motor 34 is rotated, so that the shaft 35 is rotated through the gears 341 and 342 in the direction in which the magnetic disc 23 is discharged from the magnetic disc unit.

Thus, according to the first modification, even in the case of a malfunction of the magnetic disc discharging mechanism, the magnetic disc can be discharged manually from the magnetic disc unit.

Referring next to FIG. 11, the shaft 35 is extended outwardly through the opening 344 of the front panel 31. Accordingly, in the case of a malfunction of the automatic magnetic disc discharging mechanism, one can easily turn the shaft 35 without the use of a screwdriver. Thus, the magnetic disc can be discharged from the magnetic disc unit in a manner substantially similar to that described above with reference to FIG. 10.

Figure 12:
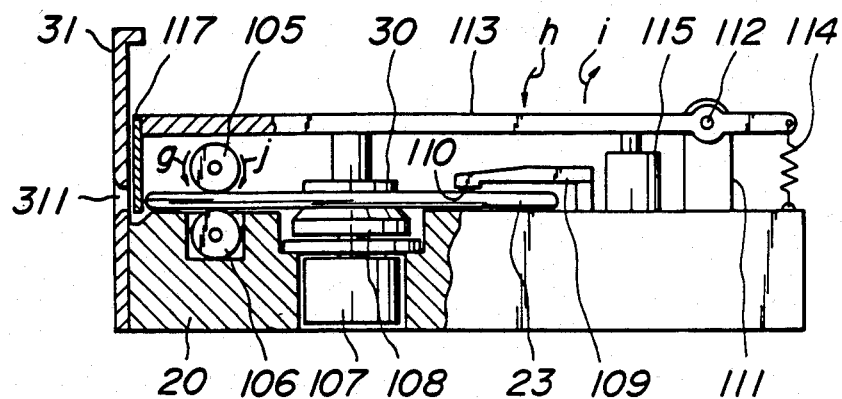
FIG. 12 is a side view showing, partially broken away, a second embodiment of a magnetic disc unit in accordance with the present invention.
Figure 13:
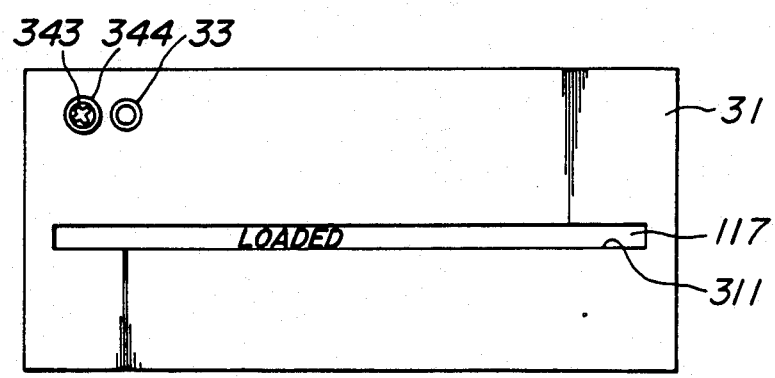
FIG. 13 is a front view thereof.

Second Embodiment, FIGS. 12 and 13

Referring first to FIG. 12, the main frame 20 supports all the component parts of a magnetic disc unit as a disc unit according to the present invention. The front panel 31 is fixedly attached to the front end of the frame 20. The front panel has the magnetic disc insertion slot 311. A magnetic disc 23 which can be encased in a flat case is guided along the guides 21 and 22 to be placed upon the upper surface of the frame 20.

In the vicinity of the insertion slot 311, is disposed a feed roller 105 for loading the magnetic disc 23. A pinch roller 106 is disposed on the opposite side of the drive or feed roller 105 in such a way that the top of the pinch roller 106 is substantially in a coplanar relationship with the upper surface of the frame 20. The magnetic disc 23 is clamped between the drive and pinch rollers 105 and 106, when the magnetic disc 23 is loaded into or discharged from the magnetic disc unit. The drive roller 105 is drivingly coupled to the motor 34 shown in FIGS. 3, 4 and 6.

A motor 107 for rotating the magnetic disc 23 is disposed at an inner side of the drive roller 105 and a spindle 108 is fixedly attached to an end of the output shaft of the motor 107 in such a way that the spindle 108 engages with the center hole (not shown) of the magnetic disc 23 so as to hold the magnetic disc 23. The upper end of the spindle 108 is slightly extended upwardly from the upper surface of the frame 20.

A head supporting member 109 having substantially an L-shape is disposed on the upper surface of the frame 20, so that a magnetic head 110 is fixedly supported at the free end of the head supporting member 109 for slidably contacting the magnetic disc 23 for recording or reproduction. The magnetic head 110 is swingably positioned to be in contact with the surface of the magnetic disc 23 by the head supporting member 109. That is, the head supporting member 109 is swingably slidable over the magnetic disc 23 by a driving means (not shown).

An arm support 111 protrudes from the frame 20 at the rear thereof and an elongated supporting arm 113 is pivoted to the arm support 111 with a pivot pin 112. The supporting arm 113 is extended over the magnetic disc 23 toward the front panel 31.

A spring 114 is loaded between the rear or the right (in FIG. 12) end of the supporting arm 113 and the frame 20 so that the supporting arm 113 is normally biased in the clockwise direction as indicated by an arrow i. An electromagnetic solenoid 115 is disposed in front of the arm support 111 and the plunger of the solenoid 115 is coupled to the supporting arm 113. Therefore, when the solenoid 115 is energized, the supporting arm 113 is rotated in the counterclockwise direction as indicated by an arrow h.

The cone 30 is attached to the supporting arm 113 in a manner such that the cone 30 is opposite to the spindle 108. The cone 30 is adapted to co-operate with the spindle 108 so as to clamp the magnetic disc 23 between the cone 30 and the spindle 108. A shutter 117 is attached to the front or the left (in FIG. 12) end of the supporting arm 113 in such a way that the shutter 117 closes the magnetic disc insertion slot 311. The shutter 117 is in the form of a plate and, as shown in FIG. 13, has a sign such as "LOADED" or "DISC LOADED" on the front surface of the shutter 117, so that the sign can easily be viewed through the insertion slot 311.

In addition to the component parts described above, the magnetic disc unit of the second embodiment is provided with the photoswitch 62 as means for detecting whether or not a magnetic disc is inserted into the magnetic disc unit and the microswitch 61 as means for detecting the position of the magnetic disc loaded into the magnetic disc unit.

Next, the mode of operations of the second embodiment with the above described construction will be described in detail.

First, the magnetic disc 23 is inserted into the magnetic disc unit through the insertion slot 311 in such a way that the leading edge of the magnetic disc 23 is clamped between the drive and pinch rollers 105 and 106. Then, the photoswitch 62 detects the insertion of the magnetic disc 23. In response to the output signal from the photoswitch 62, the motor 34 is driven. Then, the drive roller 105 is rotated in the counterclockwise direction as indicated by an arrow g in FIG. 12, so that the magnetic disc 23 is brought into the magnetic disc unit.

When the magnetic disc 23 reaches its operative position, the microswitch 61 produces the signal, in response to which the motor 34 stops and consequently the transfer of the magnetic disc 23 is ceased. At the same time, the solenoid 115 is energized, so that its plunger is withdrawn and consequently the supporting arm 113 is caused to rotate in the counterclockwise direction as indicated by the arrow h against the force of the spring 14. As a result, the cone 30 is lowered to be engaged with the spindle 108 through the center opening (not shown) of the magnetic disc 23. Thus, the magnetic disc 23 is clamped by the cone 30 and the spindle 108 at its operative position.

As the supporting arm 113 is rotated in the counterclockwise direction as indicated by the arrow h, the shutter 117 at the front end thereof is lowered, so that the insertion slot 311 is closed by the shutter 117. As a result, the sign "LOADED" or "DISC LOADED" is displayed through the insertion slot 311.

Thereafter, the motor 107 is energized so that the spindle 108 is rotated and consequently the magnetic disc 23 is rotated. The magnetic head 110 slidably contacts the magnetic disc 23, so that information is recorded on or reproduced from the magnetic disc 23.

After the recording or reproducting operation, the motor 107 is stopped and accordingly the rotation of the magnetic disc 23 is stopped. Thereafter, the solenoid 115 is deenergized so that the supporting arm 113 is caused to rotate in the clockwise direction as indicated by the arrow i under the force of the bias spring 114. As a consequence, the cone 30 is lifted away from the spindle 108, so that the magnetic disc 23 is released from its clamping. As the supporting arm 113 is rotated in the clockwise direction as indicated by the arrow i, the shutter 117 at the front end thereof is lifted, so that the magnetic disc insertion slot 311 is opened.

Thereafter, the driving motor 34 is energized to rotate the drive roller 105 in the clockwise direction as indicated by the arrow j, so that the magnetic disc 23 is discharged through the insertion slot 311 from the magnetic disc unit.

While, in the second embodiment, it has been described that the shutter 117 has the sign such as "LOADED" or "DISC LOADED", it is to be understood that the shutter 117 may be painted with a particular color which can be readily distinguished from a color of the front panel 31, so that an operator may easily notice whether the magnetic disc is loaded or not. For instance, if the color of the front panel 31 is silver-gray, the color of the shutter 117 may be bright yellow, so that when the disc insertion slot 311 is closed by the shutter 117, the bright yellow color of the shutter 117 can be vividly viewed. Therefore, an operator can immediately notice that the disc insertion slot 311 is closed, i.e., the magnetic disc 23 is loaded in the magnetic disc unit. Furthermore, for instance, when the color of the front panel 31 is a bright color such as white, it is not preferable that the color of the shutter 117 is dark such as black. The reason is that the magnetic disc 23 is in general encased in a black jacket and in addition the magnetic disc insertion slot 311 tends to be shadowed inherently, because of its structure. Therefore, when the color of the shutter 117 is black, it is difficult to distinguish whether the shutter 117 is closed or opened.

It is to be further understood that the sign on the front surface of the shutter 117 may be represented by a particular symbol like X mark, letter, figure or a combination thereof.

Accordingly, in the present invention, an accidental intrusion of an alien substance like a finger of an operator into the disc insertion slot is prevented during the recording or reproducing operation, so that the recording or reproducing operation is not disturbed. In addition, the sign on the front surface of the shutter aids an easy confirmation of the disc loading.

Further, it is also to be noted that the present invention is advantageously applicable not only to the above-described magnetic disc unit but also to various recording/reproducing unit using a disc-like recording medium, such as an optical disc unit employing an optical disc as such recording medium.

What is claimed is:

1. A disc unit in which information is recorded on or reproduced from a disc loaded therein, comprising:
   (a) disc transfer means for transferring said disc which is inserted into said disc unit through an insertion opening thereof to its operative position and for transferring the loaded disc from its operative position toward said insertion opening, through which said disc is discharged;
   (b) clamping means for clamping said loaded disc at its operative position;
   (c) single drive means for selectively driving either one of said disc transfer means or said clamping means;
   (d) clutch means for selectively coupling single drive means to either one of said disc transfer means or said clamping means;
   (e) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;
   (f) coupling means for transmitting the rotation of said single drive means to said roller means, said coupling means having cam means drivingly coupled to said single drive means;
   (g) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed; and (h) means for controlling said cam means to actuate said clamping means in a manner such that the disc is released when the rotation of said single drive means starts rotating in said opposite direction and for controlling said cam means to actuate said coupling means in a manner such that the rotation of said single drive means is transmitted to said roller means when the release is completed.

2. A disc unit as claimed in claim 1, further comprising a manual drive mechanism including a shaft for manually driving said disc transfer means in a manner such that the loaded disc is transferred toward said insertion opening so that said loaded disc is discharged from said insertion opening.

3. A disc unit as claimed in claim 2, wherein said manual drive mechanism manually drive said clamping means to release said loaded disc.

4. A disc unit as claimed in claim 2, wherein said manual drive mechanism comprises a rotating member having one end which is so disposed that said rotating member can manually be rotated from the outside of said disc unit, and said disc transfer means is driven so as to transfer said disc toward said insertion opening, so that said disc is discharged from said insertion opening.

5. A disc unit as claimed in claim 4, wherein said one end of said rotating member is extended outwardly from said disc unit.

6. A disc unit as claimed in claim 1, wherein said single drive means comprises an electric motor having an output shaft.

7. A disc unit as claimed in claim 6, further comprising a manual drive mechanism including a rotating member which is coaxially coupled to the output shaft of said electric motor, so that said rotating member can be rotated from the outside of said disc unit.

8. A disc unit in which information is recorded on or reproduced from a disc loaded therein, comprising:
(a) disc transfer means for transferring said disc which is inserted into said disc unit through an insertion opening thereof to its operative position and for transferring the loaded disc from its operative position toward said insertion opening, through which said disc is discharged;
(b) single driving means for driving said disc transfer means; and
(c) a manual drive mechanism including a roltatable shaft member for manually driving said disc transfer means in a manner that the loaded disc is transferred toward said insertion operating so that said loaded disc is discharged from said insertion opening.

9. A disc unit as claimed in claim 8, wherein said manual drive mechanism comprises a rotating member having one end which is so disposed that said rotating member can manually be rotated from the outside of said disc unit, and said disc transfer means is driven so as to transfer said disc toward said insertion opening, so that said disc is discharged from said insertion opening.

10. A disc unit as claimed in claim 9, wherein said one end of said rotating member is extended outwardly from said disc unit.

11. A disc unit as claimed in claim 8 wherein said single driving means comprises an electric motor having an output shaft and said disc is a magnetic disc.

12. A disc unit as claimed in claim 11, further comprising a manual drive mechanism including a rotating member which is coaxially coupled to the output shaft of said electric motor, so that said rotating member can be rotated from the outside of said disc unit.

13. A disc unit as claimed in claim 8, further comprising shutter means for shielding said insertion opening when said disc is loaded into said disc unit.

14. A disc unit as claimed in claim 13, wherein said shutter means has a member for closing said insertion opening, said member having a surface for displaying information with respect to the loading of said disc into said disc unit, at such a position of said surface that the display is viewed when said member closes said insertion opening.

15. A disc unit in which information is recorded on or reproduced from a disc loaded therein, comprising:
(a) disc trnsfer means for transferring said disc which is inserted into said disc unit through an insertion opening thereof to its operative position and for transferring the loaded disc from its operative position toward said insertion opening, through which said disc is discharged,
(b) clamping means for clamping said loaded disc at is operative position;
(c) single drive means for selectively driving either one of said disc transfer means or said clamping means;
(d) clutch means for selectively coupling said single drive means to either one of said disc transfer means or said clamping means;
(e) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means; and
(f) a manual drive mechanism including a shaft for manually driving said disc transfer means in a manner such that the loaded disc is transferred toward said insertion opening so that said loaded disc is discharged from said insertion opening.

16. A disc unit as claimed in claim 15, wherein said manual drive mechanism manually drives said clamping means to release said loaded disc.

17. A disc unit as claimed in claim 15, wherein said manual drive mechanism comprises a rotating member having one end which is so disposed that said rotating member can manually be rotated from the outside of asid disc unit, and said disc transfer means is driven so as to transfer said disc toward said insertion opening, so that said disc is discharged from said inserting opening.

18. A disc unit as claimed in claim 17, wherein said one end of said rotating member is extended outwardly from said disc unit.

19. A disc unit as claimed in claim 15, wherein said single drive means comprises an electric motor having an output shaft.

20. A disc unit as claimed in claim 19, further comprising a manual drive mechanism including a rotating member which is coaxially coupled to the output shaft of said electric motor, so that said rotating member can be rotated from the outside of said disc unit.

21. A disc unit as claimed in claim 15, further comprising a shutter means for shielding said insertion opening when said disc is loaded into said disc unit, said shutter means being attached to an end of said clamping means.

22. A disc unit as claimed in claim 21, wherein said shutter means has member for closing said insertion opening, said member having a surface for displaying information with respect to the loading of said disc into said disc unit, at such a position of said surface that the display is viewed when said member closed said insertion opening.

23. A disc unit as claimed in claim 15, wherein said disc is a magnetic disc and said disc unit further comprises shutter means for shielding said insertion opening when said magnetic disc is loaded into said disc unit.

24. A disc unit in which information is recorded on or reproduced from a disc loaded therein, comprising:
(a) disc transfer means for transferring said disc which is inserted into said disc unit through an insertion opening thereof to its operative position and for transferring the loaded disc from its operative position toward said insertion opening, through which said disc is discharged;
(b) clamping means for clamping said loaded disc at its operative position;
(c) single drive means for selectively driving either one of said disc transfer means or said clamping means;
(d) cltuch means for selectively coupling said signle drive means to either one of said disc transfer means or said clamping means;
(e) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means; and
(f) coupling means for transmitting the rotation of said single drive means to said roller means, said coupling means having cam means drivingly coupled to said single drive means.

25. A disc unit in which information is recorded on or reproduced from a disc loaded therein, comprising:
(a) disc transfer means for transferring said disc which is inserted into said disc unit through an insertion opening thereof to its operative position and for transferring the loaded disc from its operative position toward said insertion opening, through which said disc is discharged,
(b) clamping means for clamping said loaded disc at its operative position;
(c) signle drive means for selectively driving either one of said disc transfer means or said clamping means;
(d) clutch means for selectively coupling said single drive means to either one of said disc transfer means or said clamping means;
(e) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;
(f) coupling means for transmitting the rotation of said single drive means to said roller means, said coupling means having cam means drivingly coupled to said single drive means; and
(g) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed.

26. A disc unit in which information is recorded on or reproduced from a disc loaded therein, comprising:
(a) disc transfer means for transferring said disc which is inserted into said disc unit through an insertion opening thereof to its operative position and for transferring the loaded disc from its operative position toward said insertion opening, through which said disc is discharged;
(b) clamping means for clamping said loaded disc at its operative position;
(c) single drive means for selectively driving either one of said disc transfer means or said clamping means;
(d) clutch means for selectively coupling said; single drive means to either one of said disc transfer means or said clamping means;
(e) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;
(f) coupling means for transmitting the rotation of said single drive means to said roller means, said coupling means having cam means drivingly coupled to said single drive means;
(g) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed; and
(h) means for controlling said cam means to actuate said clamping means in a manner such that the disc is released when the rotation of said single drive means starts rotating in said opposite direction and for controlling said cam means to actuate said coupling means in a manner such that the rotation of said single drive means is transmitted to said roller means when the release is completed.

27. A disc unit in which information is recorded on or reproduced from a disc loaded therein, comprising:

(a) disc transfer means for transferring said disc which is inserted into said disc unit through an insertion opening thereof to its operative position and for transferring the loaded disc from its operative position toward said insertion opening, through which said disc is discharged;

(b) single driving means for driving said disc transfer means;

(c) a manual drive mechanism including a rotatable shaft member for manually driving said disc transfer means in a manner that the loaded disc is transferred toward said insertion opening so that said loaded disc is discharged from said insertion opening; and (d) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means.

28. A disc unit as claimed in claim 27, wherein said manual drive mechanism comprises a rotating member having one end which is so disposed that said rotating member can manually be rotated from the ouside of said disc unit, and said disc transfer means is driven so as to transfer said disc toward said insertion opening, so that said disc is discharged from said insertion opening.

29. A disc unit as claimed in claim 28, wherein said one end of said rotating member is extended outwardly from said disc unit.

30. A disc unit as claimed in claim 27, wherein said single driving means comprises an electric motor having an output shaft and said disc is a magnetic disc.

31. A disc unit as claimed in claim 30, further comprising a manual drive mechanism including a rotating member which is coaxially coupled to the output shaft of said electric motor, so that said rotating member can be rotated from the outside of said disc unit.

32. A disc unit as claimed in claim 27, further comprising shutter means for shielding said insertion opening when said disc is loaded into said disc unit.

33. A disc unit as claimed in claim 32, wherein said shutter means has a member for closing said insertion opening, said member having a surface for displaying information with respect to the loading of said disc into said disc unit, at such a position of said surface that the display is viewed when said member closes said insertion opening.

34. A disc unit in which information is recorded on or reproduced from a disc loaded therein, comprising:

(a) disc transfer means for transferring said disc which is inserted into said disc unit through an insertion opening thereof to its operative position and for transferring the loaded disc from its operative position toward said insertion opening, through which said disc is discharged;

(b) single driving means for driving said disc transfer means;

(c) a manual drive mechanism including a rotatable shaft member for manually driving said disc transfer means in a manner that the loaded disc is transferred toward said insertion opening so that said loaded disc is discharged from said insertion opening;

(d) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means; and (e) coupling means for transmitting the rotation of said single drive means to said roller means, said coupling means having cam means drivingly coupled to said single drive means.

35. A disc unit in which information is recorded on or reproduced from a disc loaded therein, comprising:

(a) disc transfer means for transferring said disc which is inserted into said disc unit through an insertion opening thereof to its operative position and for transferring the loaded disc from its operative position toward said insertion opening, through which said disc is discharged;

(b) single driving means for driving said disc transfer means;

(c) a manual drive mechanism including a rotatable shaft member for manually driving said disc transfer means in a manner that the loaded disc is transferred toward said insertion opening so that said loaded disc is discharged from said insertion opening;

(d) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;

(e) coupling means for transmitting the rotation of said single drive means to said roller means, said coupling means having cam means drivingly coupled to said single drive means; and (f) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping in a manner such that said clamping means clamps said disc when the interruption is completed.

36. A disc unit in which information is recorded on or reproduced from a disc loaded therein, comprising:

(a) disc transfer means for transferring said disc which is inserted into said disc unit through an insertion opening thereof to its operative position and for transferring the loaded disc from its operative position toward said insertion opening, through which said disc is discharged;

(b) single driving means for driving said disc transfer means;

(c) a manual drive mechanism including a rotatable shaft member for manually driving said disc transfer means in a manner that the loaded disc is transferred toward said insertion opening so that said loaded disc is discharged from said insertion opening;

(d) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;

(e) coupling means for transmitting the rotation of said single drive means to said roller means, said coupling means having cam means drivingly coupled to said single drive means; and (f) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed; and (g) means for controlling said cam means to actuate said clamping means in a manner such that the disc is released when the rotation of said single drive means starts rotating in said opposite direction and for controlling said cam means to actuate said coupling means in a manner such that the rotation of said single drive means is transmitted to said roller means when the release is completed.

37. A disc unit comprising:
(a) disc transfer means for transferring a disc which is inserted into said disc unit through an insertion opening thereof to its operative position and for transerring the loaded disc from its operative position toward said insertion opening, through which said disc is discharged;
(b) single driving means for driving said disc transfer means;
(c) loading means for transferring the inserted disc to a predetermined position within said disc unit, said loading means being driven by the driving force of said single driving means;
(d) means for recording or reproducing information on or from said loaded disc;
(e) shutter means for shielding said insertion opening when said disc is brought to said predetermined position by said loading means;
(f) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;

(g) coupling means for transmitting the rotation of said single drive means to said roller means, said coupling means having cam means drivingly coupled to said single drive means;
(h) clamping means for clamping said loaded disc at its operative position; and
(i) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed.

38. A disc unit as claimed in claim 37, wherein said shutter means has a member for closing said insertion opening, said member having a surface for displaying information with respect to the loading of said disc into said disc unit, at such a position of said surface that the display is viewed when said member closes said insertion opening.

39. A disc unit comprising:
(a) disc transfer means for transferring a disc which is inserted into said disc unit through an insertion opening thereof to its operative position and for transferring the loaded disc from its operative position toward said insertion opening, through which said disc is discharged;
(b) single driving means for driving said disc transfer means;
(c) loading means for transferring the inserted disc to a predetermined position within said disc unit, said loading means being driven by the driving force of said single driving means;
(d) means for recording or reproducing information on or from said loaded disc;
(e) shutter means for shielding said insertion opening when said disc is brought to said predetermined position by said loading means;
(f) roller means for engaging one major surface of said disc inserted through said insertion opening, for transferring the inserted disc toward said operative position when a rotation of said single drive means in one direction is transmitted to said roller means and for transferring the loaded disc toward said insertion opening, through which the disc is discharged out of said disc unit when the rotation of said single drive means in the direction opposite to said one direction is transmitted to said roller means;
(g) coupling means for transmitting the rotation of said single drive means to said roller means, said coupling means having cam means drivingly coupled to said single drive means;
(h) clamping means for clamping said loaded disc at its operative position;
(i) means for controlling said cam means to actuate said coupling means in a manner such that the transmission of the rotation of said single drive means to said roller means is interrupted when the transfer of said disc by said rotation of said single drive means in said one direction is completed and for controlling said cam means to actuate said clamping means in a manner such that said clamping means clamps said disc when the interruption is completed; and (j) means for controlling said cam means to actuate said clamping means in a manner such that the disc is released when the rotation of said single drive means starts rotating in said opposite direction and for controlling said cam means to actuate said coupling means in a manner such that the rotation of said single drive means is transmitted to said roller means when the release is completed.

40. A disc unit as claimed in claim 39, wherein said shutter means has a member for closing said insertion opening, said member having a surface for displaying information with respect to the loading of said disc into said disc unit, at such a position of said surface that the display is viewed when said member closes said insertion opening.

41. A disc unit in which information is recorded on or reproduced from a magnetic disc loaded therein, comprising:
    (a) disc transfer means for transferring said magnetic disc which is inserted into said disc unit through an insertion opening thereof to its operative position and for transferring the loaded magnetic disc from its operative position toward said insertion opening, through which said magnetic disc is discharged;
    (b) clamping means for clamping said loaded magnetic disc at its operative position;
    (c) single drive means for selectively driving either one of said disc transfer means or said clamping means;
    (d) clutch means for selectively coupling said single drive means to either one of said disc transfer means or said clamping means;
    (e) a manual drive mechanism including a shaft for manually driving said disc transfer means in a manner such that the loaded magnetic disc is transferred toward said insertion opening so that said loaded magnetic disc is discharged from said insertion opening; and
    (f) shutter means for shielding said insertion opening when said magnetic disc is loading into said disc unit.

* * * * *

UNITED STATES PATENT AND TRADEMARK OFFICE
CERTIFICATE OF CORRECTION

PATENT NO. : 4,670,802

DATED : June 2nd, 1987

INVENTOR(S) : Tetsu OGAWA ET AL.

It is certified that error appears in the above-identified patent and that said Letters Patent is hereby corrected as shown below:

ON THE TITLE PAGE ITEM [73] should read
-- Assignee: Canon Denshi Kabushiki Kaisha
             Chichibu, Japan --

Signed and Sealed this

First Day of December, 1987

Attest:

DONALD J. QUIGG

Attesting Officer

Commissioner of Patents and Trademarks